(12) United States Patent
Grass et al.

(10) Patent No.: US 12,376,520 B2
(45) Date of Patent: Aug. 5, 2025

(54) LAND ROLLER WITH REPLACEABLE CHOPPING BLADES

(71) Applicant: J A Redekop Holdings Ltd., Winkler (CA)

(72) Inventors: Martin Grass, Winkler (CA); Waldemar Berg, Winkler (CA); Johan Redekop, Winkler (CA)

(73) Assignee: J A Redekop Holdings Ltd., Winkler (CA)

( * ) Notice: Subject to any disclaimer, the term of this patent is extended or adjusted under 35 U.S.C. 154(b) by 706 days.

(21) Appl. No.: 17/735,573

(22) Filed: May 3, 2022

(65) Prior Publication Data

US 2023/0354743 A1 Nov. 9, 2023

(51) Int. Cl.
*A01D 34/835* (2006.01)
*A01D 34/52* (2006.01)

(52) U.S. Cl.
CPC ......... *A01D 34/8355* (2013.01); *A01D 34/52* (2013.01)

(58) Field of Classification Search
CPC ..... A01D 34/8355; A01D 34/52; A01D 34/53
See application file for complete search history.

(56) References Cited

U.S. PATENT DOCUMENTS

| | | | | |
|---|---|---|---|---|
| 323,266 A | * | 7/1885 | Bradley | A01B 35/16 172/552 |
| 487,722 A | * | 12/1892 | Dernell | A01B 15/025 172/508 |
| 557,006 A | * | 3/1896 | Miller | A01B 39/04 404/124 |
| 1,128,337 A | * | 2/1915 | Luttrell | A01B 33/144 172/532 |
| 2,553,356 A | | 5/1951 | Cady | |
| 3,675,724 A | * | 7/1972 | Schneider | A01B 33/022 172/554 |
| 5,953,895 A | | 9/1999 | Hobbs | |
| 6,539,697 B2 | | 4/2003 | Burk | |
| 9,949,432 B2 | | 4/2018 | Redekop | |
| 2016/0082542 A1 | * | 3/2016 | Hiramatsu et al. | B23K 11/0026 403/270 |
| 2017/0127610 A1 | * | 5/2017 | Redekop | A01D 34/8355 |

* cited by examiner

*Primary Examiner* — Tara Mayo
(74) *Attorney, Agent, or Firm* — Ryan W. Dupuis; Michael R. Williams; Ade & Company Inc.

(57) ABSTRACT

A land roller implement for chopping vegetation on the ground has one or more rollers including a drum body with mounting flanges protruding radially from the drum body onto which chopping blades can be fastened. The mounting flanges are fixed to the drum body with front weld beads that are spaced apart along the leading face of the mounting flanges. The blades are notched along the inner end to define recessed portions aligned with and receiving the front weld beads therein such that protruding portions at the inner end of the blades between the recessed portions are able to abut against the peripheral surface of the drum body without interference by the front weld beads. The bolts fastening the blades to the mounting flanges are thus isolated from shear forces by the abutting protruding portions while the mounting flanges remain secured against folding backward due to the presence of the front weld beads within the recessed portions.

20 Claims, 4 Drawing Sheets

LAND ROLLER WITH REPLACEABLE CHOPPING BLADES

FIELD OF THE INVENTION

The present invention relates to an agricultural land roller for being supported on a land roller implement alone or with additional land rollers in which each land roller comprises a drum body supported for rolling movement along the ground. More particularly, the present invention relates to a land roller having a drum body that further includes chopping blades protruding radially therefrom for crushing and/or chopping agricultural plant residue including plant stalks and the like.

BACKGROUND

Land roller implements are known to be used in agriculture for levelling land, pushing rocks down into the soil, breaking up soil mounds and clods, or packing seed for example. A typical land roller includes a plurality of frame sections, each supporting at least one roller thereon. The roller may be a steel drum, a series of packer wheels or any other rolling packing element.

In some instances, it is known to provide a land roller implement in which the drum body of each roller is provided with a plurality of radially protruding chopping blades intended for breaking, crushing, and/or chopping the plant residue or stubble remaining in a farm field following the crop harvest. Examples of stubble choppers are described in U.S. Pat. No. 2,533,356 by Cady and U.S. Pat. No. 6,539,697 by Burk. In each instance, the blades are not suitably arranged for quick and ready replacement on the peripheral surface of the drum body in the event of damage, or for sharpening for example.

U.S. Pat. No. 5,953,895 by Hobbs discloses another example of a land roller implement having roller comprising a drum body supporting radially protruding chopping blades thereon, in which the chopping blades are readily releasable from the drum body by being bolted to respective mounting flanges protruding radially from the peripheral surface of the drum body. As shown in FIG. 2 of Hobbs, each blade 22 is supported on a mounting flange. In order to provide proper support to the blades to prevent shearing of the bolts as the blades impact the ground during rolling motion, the blades must be butted up against the outer peripheral surface of the drum. This does not allow for the leading face of the mounting flange to be welded to the drum surface as the weld bead would interfere with abutment of the blade with the peripheral drum surface as shown in attached FIGS. 2 and 3 of the current specification. Elimination of a weld along the front face as in attached FIG. 2 would cause the mounting plates to readily fold back against the drum as the roller is displaced along the ground, thus necessitating the use of rear braces supporting each mounting flange. Without braces, the leading face of the mounting flanges must be welded to the drum surface, however, the weld bead would interfere with abutment of the blade against the outer surface of the drum as shown in attached FIG. 3 of the current specification such that the bolts are not isolated from shear forces and tend to break as the blades impact the ground in this instance.

U.S. Pat. No. 9,949,432 by Redekop discloses an arrangement of a land roller with chopping blades in which spacers are welded to the periphery of the drum at spaced positions along the leading face of mounting flanges that are welded to the drum at the leading side between the spacers. The blades can thus be abutted against the spacers without interference by the welded beads at the leading face of the mounting flange to secure the blade relative to the drum. Separately welding each of the individual spacers can require a considerable amount of labor to install.

SUMMARY

According to one aspect of the present invention there is provided a ground roller for being supported on a land roller implement for chopping vegetation on the ground, the land roller implement having a main frame arranged for connection to a towing vehicle for movement in a forward working direction with the towing vehicle, the ground roller comprising:

a drum body having an outer periphery which is generally cylindrical about a drum axis and being arranged to be supported on the main frame for rotation relative to the main frame about the drum axis in which the drum axis is oriented transversely to the forward working direction for rolling movement across the ground in the forward working direction;

a plurality of mounting flanges supported on the drum body so as to extend at least partly in an axial direction of the drum body and so as to protrude outward from the outer periphery of the drum body, each mounting flange being welded to a peripheral surface of the drum body at a leading face of the mounting flange by a plurality of weld beads at respective weld locations spaced apart in the axial direction of the drum body;

a plurality of blades supported on the leading faces of the mounting flanges respectively such that each blade extends radially outwardly from an inner end to an outer end which is spaced radially outwardly in relation to the respective mounting flange;

the inner end of each blade including at least one protruding portion defining an innermost edge of the blade and at least one recessed portion forming a raised inner edge of the blade which is raised radially outward from the drum body relative to the innermost edge of the blade; and each weld bead of each mounting flange being aligned in the axial direction with sad at least one recessed portion of the respective blade supported on the mounting flange.

According to a second aspect of the present invention there is provided a land roller implement arranged to be towed in a forward working direction by a towing vehicle for chopping vegetation on the ground, the implement comprising:

a main frame arranged for connection to the towing vehicle; and at least one ground roller supported on the main frame for rotation about a drum axis oriented transversely to the forward working direction so as to be arranged for rolling movement across the ground, said at least one ground roller comprising:

a drum body having an outer periphery which is generally cylindrical about the drum axis;

a plurality of mounting flanges supported on the drum body so as to extend at least partly in an axial direction of the drum body and so as to protrude outward from the outer periphery of the drum body, each mounting flange being welded to a peripheral surface of the drum body at a leading face of the mounting flange by a plurality of weld beads at respective weld locations spaced apart in the axial direction of the drum body;

a plurality of blades supported on the leading faces of the mounting flanges respectively such that each blade extends radially outwardly from an inner end to an outer end which is spaced radially outwardly in relation to the respective mounting flange;

the inner end of each blade including at least one protruding portion defining an innermost edge of the blade and at least one recessed portion forming a raised inner edge of the blade which is raised radially outward from the drum body relative to the innermost edge of the blade; and each weld bead of each mounting flange being aligned in the axial direction with sad at least one recessed portion of the respective blade supported on the mounting flange.

By providing a blade having an inner edge with protruding portions and recessed portions, the blade can be abutted against the peripheral surface of the drum at the protruding portions without interference with the weld beads at the leading face of the mounting flange as the weld beads can align with the recessed portions. Accordingly, each mounting flange can be welded to the peripheral surface of the drum at both leading and trailing sides thereof without interfering with the blades being butted up against a secure surface to isolate the bolts from shear forces.

Preferably the protruding portion is in abutment with the peripheral surface of the drum body.

Each blade preferably includes two of the protruding portions adjacent axially opposing ends of the blade.

When each blade is secured to the respective mounting flange using a plurality of threaded fasteners, preferably each threaded fastener is situated in alignment with said at least one protruding portion in the axial direction.

Each blade may be configured such that said at least one protruding portion of the blade is longer in the axial direction than said at least one recessed portion of the blade.

Preferably each blade comprises a plurality of the protruding portions on the blade at evenly spaced apart positions in the axial direction.

Preferably each blade also includes a plurality of recessed portions, in which each recessed portion receives a respective weld bead therein. Each weld bead preferably spans a full length of the recessed portion that receives the weld bead therein.

Each mounting flange and the respective blade supported therein may extend in the axial direction at a forward slope, for example along a helical or V-shaped path. More particularly, according to the illustrated embodiment, the blades may be supported on the ground roller in circumferentially spaced apart rows, in which the blades within each row include one or more first blades extending in the axial direction from a first end of the drum body to a central location on the drum body at a first forward slope and one or more second blades extending in the axial direction from a second end of the drum body opposite from the first end to the central location on the drum body at a second forward slope such that the one or more first blades and the one or more second blades lie along a generally V-shaped path having a forward apex at the central location.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
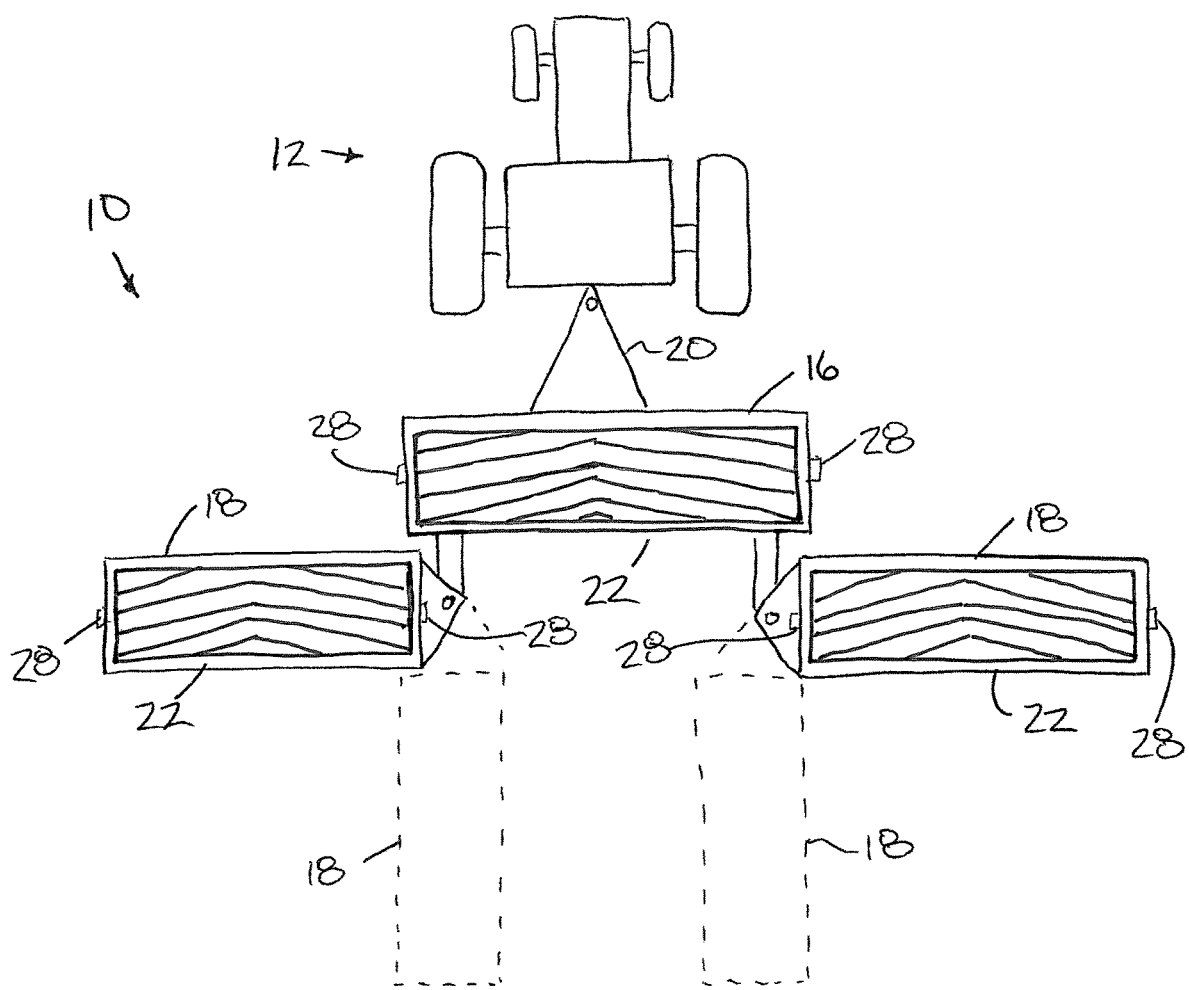
FIG. 1 is a plan view of a land roller implement with rollers having radially protruding blades thereon.
Figure 2:
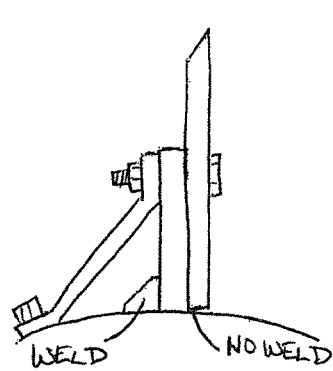
FIG. 2 is an end view of the protruding blade according to one embodiment of a prior art roller.
Figure 3:
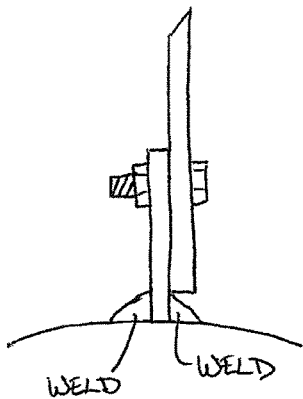
FIG. 3 is an end view of the protruding blade according to a second embodiment of a prior art roller.

Referring to the accompanying drawings, there is illustrated a land roller implement generally indicated by reference numeral 10. The implement 10 is suited for connection to a towing vehicle 12, for example an agricultural tractor, for rolling movement across the ground.

The implement 10 includes a main frame including a centre section 16 and two wing sections 18 pivotally coupled at laterally opposing sides of the centre section 16. A hitch arm 20 protrudes forwardly from the centre section 16 for connection to the towing vehicle 12. The two wing sections 18 are foldable relative to the working section between a working position shown in solid line in FIG. 1 in which the wing sections extend laterally outwardly in laterally opposing directions from opposing ends of the centre section 16, and a transport position shown in broken line in FIG. 1 in which the two wing sections extend generally rearwardly from the laterally opposing ends of the centre section.

Each section of the frame supports a respective roller 22 thereon which is arranged for rolling movement in the forward direction of the towing vehicle in the working position. Each roller 22 comprises a drum body having an outer peripheral wall 24 which defines a generally cylindrical peripheral outer surface oriented about a central drum axis of the body. Circular end walls 26 enclose the laterally opposing ends of each drum body. A shaft portion 28 protrudes axially outward from each of the two opposing end walls 26 at the drum axis for rotatable coupling to the respective section of the frame upon which the roller is supported. Each roller is thus arranged for rolling movement along the ground about the drum axis thereof as the frame is towed forwardly together with the towing vehicle by orienting the rollers in the working position so that the drum axes are perpendicular to the forward working direction of the towing vehicle.

Each roller 22 further includes a plurality of first blades 30A and second blades 30B which are supported to protrude radially outward from the outer wall 24 of the drum body at evenly spaced positions in the circumferential direction about the full circumference of the drum body. The blades extend radially outward from the drum body from an inner end of the blades closest to the drum body to an outer end of the blades farthest from the drum body. The outer end of each blade 30A and 30B includes an end portion which is tapered so as to be reduced in thickness towards a cutting edge 32 at the outer end of the blade.

Furthermore, each blade extends in an axial direction of the drum body at a slope in the forward direction of rotation to lie along a V-shaped path having a forward apex at a central location between axially opposing ends of the drum body. More particularly, the blades are positioned within rows that are circumferentially spaced apart from one another, in which the blades in each row are abutted end-to-end with one another in the axial direction along the row. In the illustrated embodiment, the blades within each row including two first blades 30A mounted end-to-end to extend in the axial direction from a first end of the drum body to the central location on the drum body at a first forward slope and two second blades 30B mounted end-to-end to extend in the axial direction from a second end of the drum body (opposite from the first end) to the central location on the drum body at a second forward slope. The innermost first blade 30A and the innermost second blade 30B meet one another at the forward apex of the row of blades at the central location between opposing ends of the drum body.

Figure 4:
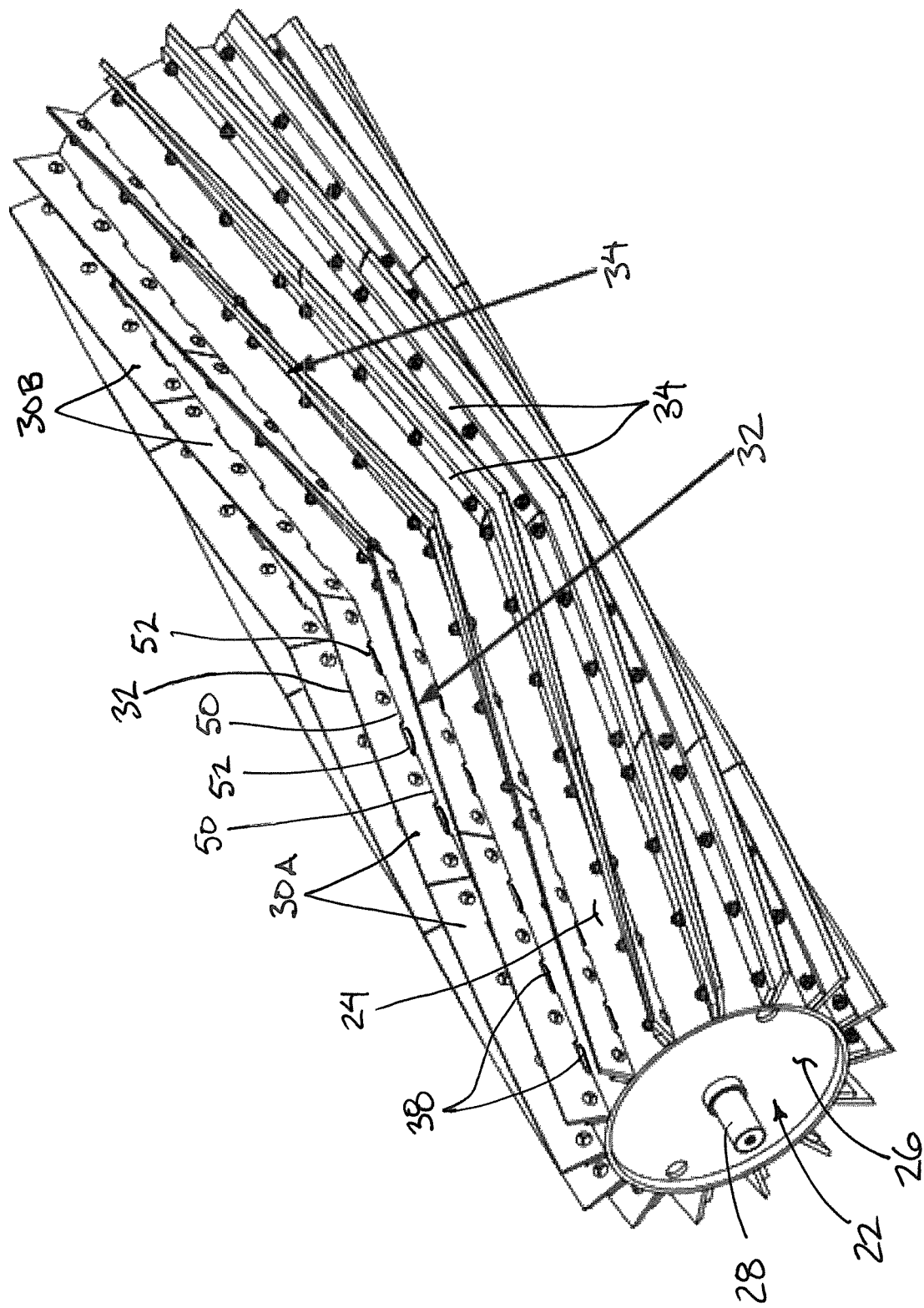
FIG. 4 is a perspective view of one of the rollers according to the implement of FIG. 1.
Figure 5:
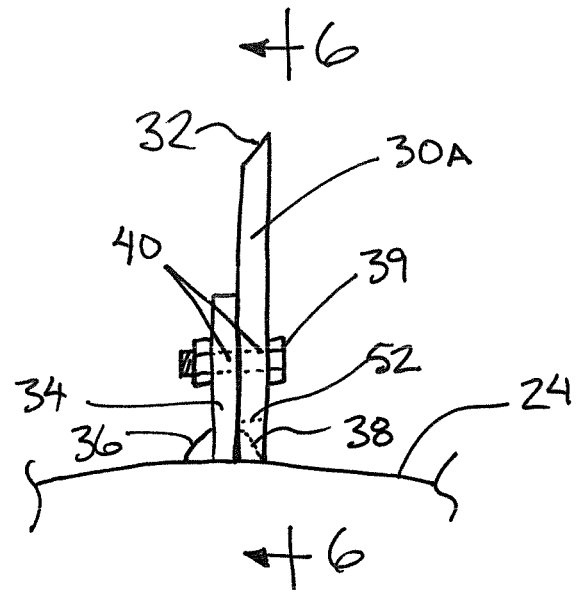
FIG. 5 is an end view of one of the blades of the roller according to FIG. 4.
Figure 6:
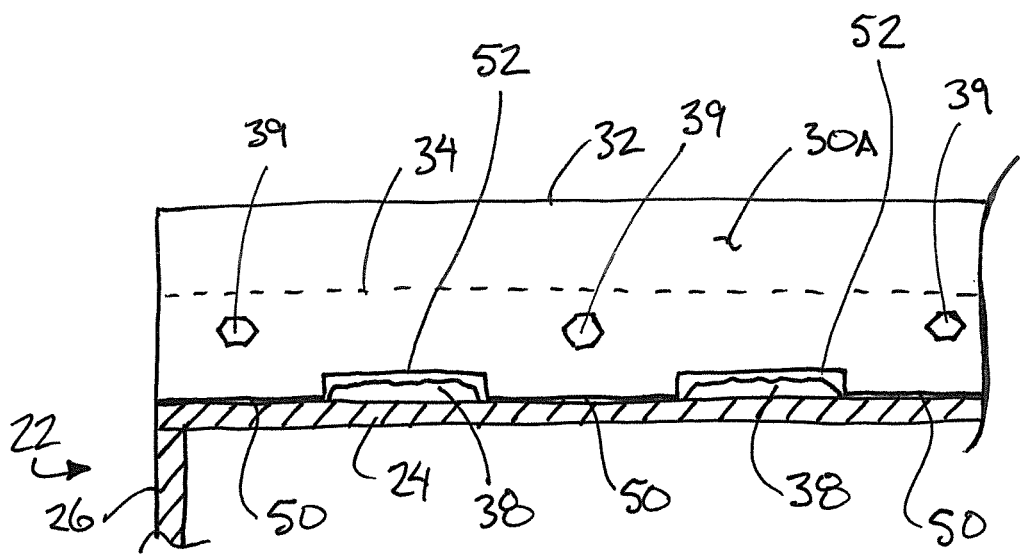
FIG. 6 is sectional view along the line 6-6 in FIG. 5.

Each row of blades 30A and 30B is supported for readily releasable attachment to the drum body by one or more mounting flanges 34 fixed onto the drum body in a row that follows along the same V-shaped path of the blades to be supported on the mounting flanges 34. The rows of mounting flanges 34 protrude radially outward from the outer peripheral wall of the drum body at evenly spaced positions in the circumferential direction corresponding to the spacing between the blades being supported on the mounting flanges respectively. Within each row, a single mounting flange may follow the V-shaped path noted above across the full width of the roller. More preferably, according to the illustrated embodiment of FIG. 4, the mounting flanges 34 within each row include a first mounting flange extending from the first end of the drum to the central location to support the first blades 30A thereon and a second mounting flange extending from the second end of the drum to the central location to support the second blades 30B thereon such that the first and second mounting flanges of each row meet one another at the forward apex of the row of blades.

The height of the mounting flanges in the radial direction as measured from the outer peripheral surface of the drum body corresponds approximately to half the height of the blades such that when mounting each blade on a respective mounting flange, the blade protrudes radially outward beyond the outer end of the respective mounting flange. The mounting flanges 34 support the first and second blades 30A and 30B to lie flat against the leading faces of the mounting flanges respectively.

Each mounting flange 34 is fixed to the peripheral surface of the drum body at both the leading face and the trailing face thereof. At the trailing face, a rear weld bead 36 joins the inner end of each mounting flange to the outer peripheral surface of the drum body continuously across the full width of the mounting flange in the lateral or axial direction. At the leading face, a plurality of separate front weld beads 38 join the inner end of each mounting flange to the outer peripheral surface of the drum at axially spaced apart weld locations along the mounting flange. The front and rear weld beads are spaced apart by the thickness of the plate forming the mounting flange so as to provide suitable support to the mounting flange to resist bending forwardly or reardwardly against the outer peripheral surface of the drum body.

Each blade 30 is secured to the front or leading face of the respective mounting flange 34 such that the blade is parallel and directly abutted against the leading face of the mounting flange. A plurality of bolts 39 are received through cooperating apertures 40 at axially spaced apart positions along each of the mounting flange 34 and the blade 30A or 30B for alignment with one another in the mounted position of the blade. Each bolt 39 is thus received through one aperture in the blade and one aperture in the mounting flange such that the head of the bolt is abutted against the leading face of the blade so that a nut can be secured to the threaded shaft portion of the bolt protruding from the trailing face of the mounting flange.

To isolate the bolts 39 from shear forces, each blade is abutted at its inner end directly against the peripheral outer surface of the drum body. In order for the inner end of the blade of the blade not to interfere with the front weld beads 36, the inner end of each blade is formed to include a plurality of protruding portions 50 that protrude radially inward towards the drum body relative to the remaining edges of the inner end of the blade so that the protruding portions 50 define the innermost edge of the blade that is abutted against the outer peripheral surface of the drum body. In turn, the protruding portions 50 define a plurality of recessed portion 52 between the protruding portions in which the resulting inner edge of the blade at each recessed portion 52 is raised radially outward from the drum body relative to the innermost edge defined by the protruding portions 50.

In the illustrated embodiment, each blade includes four protruding portions so that two of the protruding portions 50 are situated adjacent axially opposing ends of the blade and two additional protruding portions are spaced apart intermediate locations between the ends of the blade resulting in the protruding portions 50 being evenly spaced apart from one another in the axial direction. The resulting space in the axial direction between each adjacent pair of the protruding portions 50 defines one of the recessed portions 52 such that in the illustrated embodiment each blade includes three recessed portions which are evenly spaced apart in the axial direction.

Each protruding portion 50 extends in the axial direction by an overall length which is slightly greater than a corresponding length of an adjacent recessed portion 52. Each recessed portion 50 is aligned with a respective one of the front weld beads 38 such that the weld bead 38 spans substantially the full length of the recessed portion 52 in the axial direction. Furthermore, the apertures 40 locating the bolts 39 therein are each aligned with a respective one of the protruding portions 50 so as to be generally centred in the axial direction relative to the respective protruding portion. Accordingly in the illustrated embodiment a set of four threaded fasteners 39 are evenly spaced apart in the axial direction to secure each blade to the mounting flange.

The recessed portions 52 and the protruding portions 50 are formed in the blade simply by cutting rectangular notches into the inner end of the plate forming the blade so that the notches are elongated in the axial direction. Each notch has a height which is comparable to the thickness of the plate, so as to be notched radially into the plate by a distance of between 0.5 and 1 inches for example. This provides ample space for accommodating the front weld bead 38 without interfering with the blade being mounted on the front face of the corresponding mounting flange 34. The resulting protruding portions 50 are also generally rectangular in shape having a flat innermost edge aligned along a common axis with the flat innermost edges of the other protruding portions 50 on the same blade. All protruding portions thus evenly abut the outer surface of the drum in the mounted position of the blade on the drum body.

In use, each mounting flange 34 is fixed to the outer peripheral surface of the drum body by a continuous weld bead along the rear side thereof and spaced apart weld beads along the front side thereof. The front weld beads 38 receive respective ones of the protruding portions of the blades therebetween. Accordingly, each blade is supported by the protruding portions of the blade abutting the peripheral outer surface of the drum body without interference by the front weld beads 38 which are fully received within the recessed portions at the inner ends of the blades. The bolts 39 are used to maintain the blade in fixed relation against the leading face of the mounting flange while the protruding portions isolate the bolts from shear forces on the bolts resulting from the radially inward impact forces of the blades contacting the ground during rolling motion of the land roller across the ground. By providing recessed portions in the inner ends of the blades, the mounting flanges can still be welded by suitable front weld beads 38 at the leading face thereof within the recessed portions at axially spaced apart positions between the protruding portions so that full support can be provided to the blades to isolate the bolts from shear forces even when the mounting flanges are devoid of any rear brace structures because of the space provided for the front weld beads 38 within the recessed portions.

Figure 7:
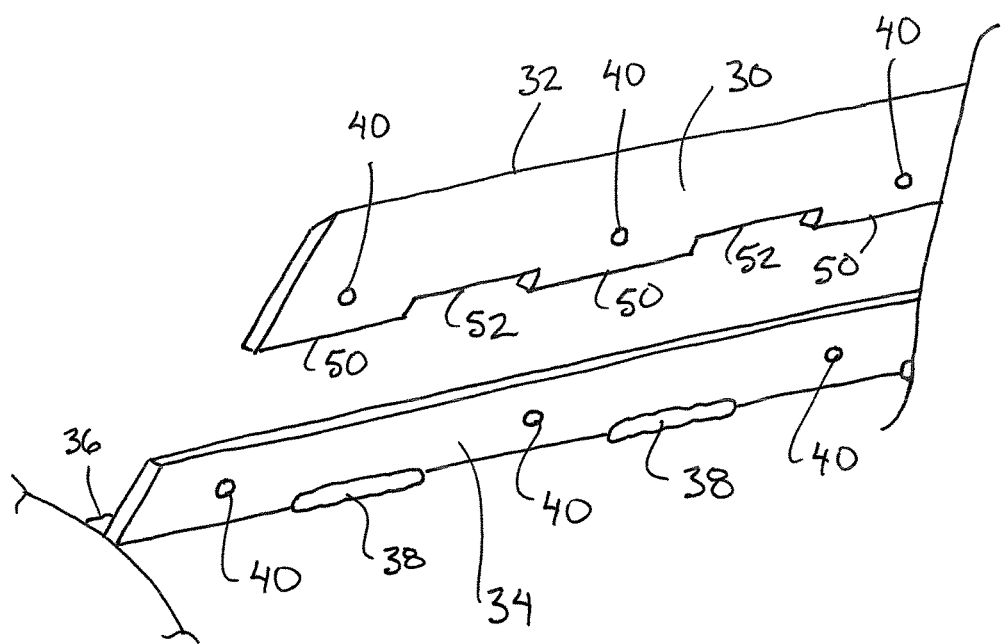
FIG. 7 is a perspective view of one of the blades shown separated from the respective mounting flange fixed to the peripheral surface of the drum body according to the implement of FIG. 1.

In the event that any one of the blades becomes damaged, for example by being chipped or dented from contact with rocks or other debris, or when periodic maintenance of the blades is required for example for sharpening, one or more of the blades can be readily separated from the drum body by removing the threaded bolts supporting that blade to the respective mounting flange as shown in FIG. 7 in which the protruding portions 50 are separable from the mounting flange 34 together with the blade upon removal of the fasteners 39.

In the illustrated embodiment, the front weld bead 38 may be spaced a distance of approximately 4 to 5 inches in the axial direction while spanning the fully length of the recessed portion within which it is received so as to have a length of 3 to 4 inches for example. The bolt apertures centered in the axial direction relative to each protruding portion of the blade are thus spaced apart by approximately 8 inches for example. The blades and mounting flanges are each approximately 0.5 inches thick. Radial height of the mounting flanges may be near 3 inches whereas the radial height of the blades may be near 5 to 6 inches to protrude outwardly beyond the mounting flanges by a few inches. In further embodiments however, many variations to the noted dimensions are possible within the scope of the present invention.

Since various modifications can be made in my invention as herein above described, it is intended that all matter contained in the accompanying specification shall be interpreted as illustrative only and not in a limiting sense.

The invention claimed is:

1. A ground roller for being supported on a land roller implement for chopping vegetation on the ground, the land roller implement having a main frame arranged for connection to a towing vehicle for movement in a forward working direction with the towing vehicle, the ground roller comprising:

a drum body having an outer periphery which is generally cylindrical about a drum axis and being arranged to be supported on the main frame for rotation relative to the main frame about the drum axis in which the drum axis is oriented transversely to the forward working direction for rolling movement across the ground in the forward working direction;

a plurality of mounting flanges supported on the drum body so as to extend at least partly in an axial direction of the drum body and so as to protrude outward from the outer periphery of the drum body, each mounting flange being welded to a peripheral surface of the drum body at a leading face of the mounting flange by a plurality of weld beads at respective weld locations spaced apart in the axial direction of the drum body;

a plurality of blades supported on the leading faces of the mounting flanges respectively using fasteners coupling the blades to the mounting flanges such that each blade extends radially outwardly from an inner end to an outer end which is spaced radially outwardly in relation to the respective mounting flange;

the inner end of each blade including at least one protruding portion defining an innermost edge of the blade and at least one recessed portion forming a raised inner edge of the blade which is raised radially outward from the drum body relative to the innermost edge of the blade; and each weld bead of each mounting flange being aligned in the axial direction with said at least one recessed portion of the respective blade supported on the mounting flange, wherein the protruding portions are separable from the mounting flanges together with the blades upon removal of the fasteners.

2. The ground roller according to claim 1 wherein said at least one protruding portion defining the innermost edge of each blade is in direct abutment with the peripheral surface of the drum body.

3. The ground roller according to claim 1 wherein said at least one protruding portion of each blade comprises two protruding portions adjacent axially opposing ends of the blade.

4. The ground roller according to claim 1 wherein the at least one protruding portion comprises a plurality of protruding portions, wherein the fasteners coupling the blades to the mounting flanges comprise threaded fasteners, and wherein each threaded fastener is situated in alignment with a respective one of the plurality of protruding portions in the axial direction.

5. The ground roller according to claim 1 wherein each blade is configured such that said at least one protruding portion of the blade is longer in the axial direction than said at least one recessed portion of the blade.

6. The ground roller according to claim 1 wherein said at least one protruding portion of each blade comprises a plurality of protruding portions on the blade at evenly spaced apart positions in the axial direction.

7. The ground roller according to claim 1 wherein said at least one recessed portion of each blade comprises a plurality of recessed portions, each receiving a respective weld bead therein.

8. The ground roller according to claim 7 wherein each weld bead spans a full length of the recessed portion that receives the weld bead therein.

9. The ground roller according to claim 1 wherein each mounting flange and the respective blade supported therein extends in the axial direction at a forward slope.

10. The ground roller according to claim 9 wherein the blades are supported on the ground roller in circumferentially spaced apart rows, the blades within each row including one or more first blades extending in the axial direction from a first end of the drum body to a central location on the drum body at a first forward slope and one or more second blades extending in the axial direction from a second end of the drum body opposite from the first end to the central location on the drum body at a second forward slope such that the one or more first blades and the one or more second blades lie along a generally V-shaped path having a forward apex at the central location.

11. A land roller implement arranged to be towed in a forward working direction by a towing vehicle for chopping vegetation on the ground, the implement comprising:
- a main frame arranged for connection to the towing vehicle; and
- at least one ground roller supported on the main frame for rotation about a drum axis oriented transversely to the forward working direction so as to be arranged for rolling movement across the ground, said at least one ground roller comprising:
  - a drum body having an outer periphery which is generally cylindrical about the drum axis;
  - a plurality of mounting flanges supported on the drum body so as to extend at least partly in an axial direction of the drum body and so as to protrude outward from the outer periphery of the drum body, each mounting flange being welded to a peripheral surface of the drum body at a leading face of the mounting flange by a plurality of weld beads at respective weld locations spaced apart in the axial direction of the drum body;
  - a plurality of blades supported on the leading faces of the mounting flanges respectively using fasteners coupling the blades to the mounting flanges such that each blade extends radially outwardly from an inner end to an outer end which is spaced radially outwardly in relation to the respective mounting flange;
  - the inner end of each blade including at least one protruding portion defining an innermost edge of the blade and at least one recessed portion forming a raised inner edge of the blade which is raised radially outward from the drum body relative to the innermost edge of the blade; and
  - each weld bead of each mounting flange being aligned in the axial direction with said at least one recessed portion of the respective blade supported on the mounting flange,
- wherein the protruding portions are separable from the mounting flanges together with the blades upon removal of the fasteners.

12. The land roller implement according to claim 11 wherein said at least one protruding portion defining the innermost edge of each blade is in direct abutment with the peripheral surface of the drum body.

13. The land roller implement according to claim 11 wherein said at least one protruding portion of each blade comprises two protruding portions adjacent axially opposing ends of the blade.

14. The land roller implement according to claim 11 wherein the at least one protruding portion comprises a plurality of protruding portions, wherein the fasteners coupling the blades to the mounting flanges comprise threaded fasteners, and wherein each threaded fastener is situated in alignment with a respective one of the plurality of protruding portions in the axial direction.

15. The land roller implement according to claim 11 wherein each blade is configured such that said at least one protruding portion of the blade is longer in the axial direction than said at least one recessed portion of the blade.

16. The land roller implement according to claim 11 wherein said at least one protruding portion of each blade comprises a plurality of protruding portions on the blade at evenly spaced apart positions in the axial direction.

17. The land roller implement according to claim 11 wherein said at least one recessed portion of each blade comprises a plurality of recessed portions, each receiving a respective weld bead therein.

18. The land roller implement according to claim 17 wherein each weld bead spans a full length of the recessed portion that receives the weld bead therein.

19. The land roller implement according to claim 11 wherein each mounting flange and the respective blade supported therein extends in the axial direction at a forward slope.

20. The land roller implement according to claim 19 wherein the blades are supported on the ground roller in circumferentially spaced apart rows, the blades within each row including one or more first blades extending in the axial direction from a first end of the drum body to a central location on the drum body at a first forward slope and one or more second blades extending in the axial direction from a second end of the drum body opposite from the first end to the central location on the drum body at a second forward slope such that the one or more first blades and the one or more second blades lie along a generally V-shaped path having a forward apex at the central location.

* * * * *